United States Patent [19]

Grande et al.

[11] 4,404,677
[45] Sep. 13, 1983

[54] DETECTING REDUNDANT DIGITAL CODEWORDS USING A VARIABLE CRITERION

[75] Inventors: Johannes Grande, Richardson; James H. Brown, Garland, both of Tex.

[73] Assignee: Rockwell International Corporation, El Segundo, Calif.

[21] Appl. No.: 252,093

[22] Filed: Apr. 8, 1981

[51] Int. Cl.³ .................... G06F 11/08; G06F 7/02
[52] U.S. Cl. .......................... 371/69; 340/146.2
[58] Field of Search ............ 371/69; 375/94; 340/146.2

[56] References Cited

U.S. PATENT DOCUMENTS

| | | | |
|---|---|---|---|
| 3,863,215 | 1/1975 | McGrogan, Jr. | 371/69 |
| 3,919,690 | 11/1975 | Field et al. | 371/69 |
| 3,973,242 | 8/1976 | Field et al. | 371/69 X |
| 4,312,074 | 1/1982 | Pautler et al. | 371/69 X |

Primary Examiner—David H. Malzahn
Attorney, Agent, or Firm—Michael E. Taken; V. Lawrence Sewell; Howard R. Greenberg

[57] ABSTRACT

Fast response detection of repeatedly transmitted redundant digital codewords is provided by checking the same bit-position in consecutive n bit codewords. The number m of codewords checked is increased until the number of equal bit values reaches a varying threshold $j_m$ dependent upon m, or until m reaches a maximum M. This sequence is repeated for each of the remaining bit-positions of the codeword. Faster response is provided when an early threshold is reached, eliminating the need to continue checking the same bit-position in the remainder of the M codewords.

18 Claims, 8 Drawing Figures

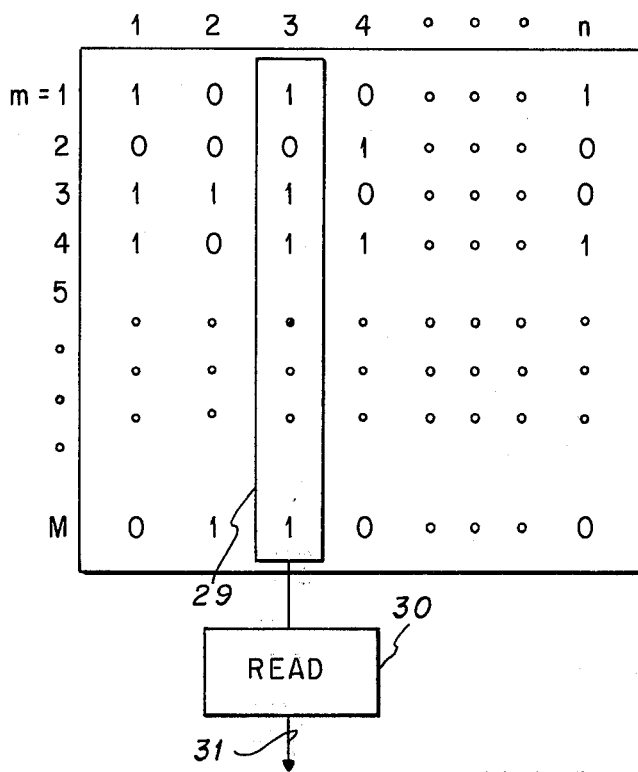

DETECTING REDUNDANT DIGITAL CODEWORDS USING A VARIABLE CRITERION

TECHNICAL FIELD

The invention relates to detection of redundant digital codewords repeatedly transmitted over a digital transmission system (including analog links using modems or the like), for example digital radio and telephone systems.

BACKGROUND

Various digital codeword detectors and detection schemes are known in the art. One technique involves scanning for N consecutive identical codewords. For example, if the codeword is 8 bits long, then all 8 bits of a first codeword must identically match all 8 bits of the second codeword. If successful, then the third codeword is tested for an identical match of all 8 bits, and so on up to N codewords.

Another detection technique involves scanning for N consecutive occurrences of grouped majority vote equal values for all bit-positions of the codeword. For example, a first group of five codewords is tested for each bit-position. In the first bit-position of each of the five codewords, a majority vote determines whether a one or a zero will be assigned to the first bit-position in a trial codeword, i.e., a three out of five majority vote in the first bit-positions of the five codewords determines the first bit-position value in the trial codeword. A majority vote is then taken on the values in the second bit-positions in the five codewords, which three out of five majority vote determines the value of the second bit-position in the trial codeword. If the codeword is 8 bits long, then this process continues until all 8 bit-positions have been tested and an 8 bit trial word has been generated. A new group of five more codewords is then tested in like manner to generate a second trial word. If this second trial word is identical to the first trial word, then a third group of five codewords is tested, and so on until N consecutive identical trial words have been generated.

SUMMARY

The present invention provides an improved digital codeword detection system which is simple and efficient, and is particularly characterized by the fast response enabled thereby.

Corresponding bit-positions for a varying number m of consecutive n bit codewords are checked. The number of equal values in each bit-position is compared against a varying threshold $j_m$ dependent upon m. The varying threshold $j_m$ in combination with the varying m enables faster detection under low error conditions because only a small number m of consecutive codewords need be checked, not a large arbitrary constant number which is preselected to accommodate an overall average of high and low error conditions.

The number m of consecutive codewords checked varies for each of the n bit-positions of the codewords, with $j_m$ varying as a function of m. Each of the n bit-positions is initially checked for a low number m of consecutive codewords, and m is increased until the number of equal bit values in that bit-position reaches the then current $j_m$ set by the then current m, or until m reaches a given maximum M.

Received data containing the codewords is stored in memory having a capacity of at least n×M bits, where each codeword is n bits long. A given bit-position of each of a variable number m of codewords is read out of the memory, where m≦M. The values in the m bit-positions are counted and compared against the variable threshold $j_m$ dependent upon m; and m is increased by reading the same given bit-position for successive, and successively older, codewords, until the count reaches $j_m$ or until m=M. A bit value signal and a bit detected signal are output if the count reaches $j_m$. The bit detected signal is stored in a second memory having a capacity of at least n bits, and the bit value signal is stored in a third memory having a capacity of at least n bits. The sequence is repeated for each of the remaining bit-positions in the codewords. The second memory outputs a codeword detected signal if it contains bit detected signals in all of its n bit-positions, and the third memory outputs a codeword value signal.

A shift register holds an M bit preset code $J_M$ whose first m bit-positions determine $j_m$. A ones counter conditionally counts the number of ones in the m codeword bit-positions as selectively enabled in bit-by-bit comparison against $j_m$ from the shift register. A zeros counter conditionally counts the number of zeros in the m codeword bit-positions as selectively enabled in bit-by-bit comparison against $j_m$ from the shift register. The m bits of $j_m$ are shifted out of the shift register one bit at a time to each of the counters to enable or disable incrementation one way or the other of each counter in bit-by-bit response to each of the respective m codeword bits. The contents of the shift register are shifted out bit by bit, increasing m and altering $j_m$, until one of the counters is incremented to a given overflow or until m=M.

BRIEF DESCRIPTION OF THE DRAWINGS

FIG. 3 schematically illustrates memory organization of the codeword memory in FIG. 1.

FIGS. 4 through 8 schematically illustrate bit-by-bit comparison of a varying number m of codeword bit-positions against a varying threshold $j_m$.

DETAILED DESCRIPTION

Figure 1:
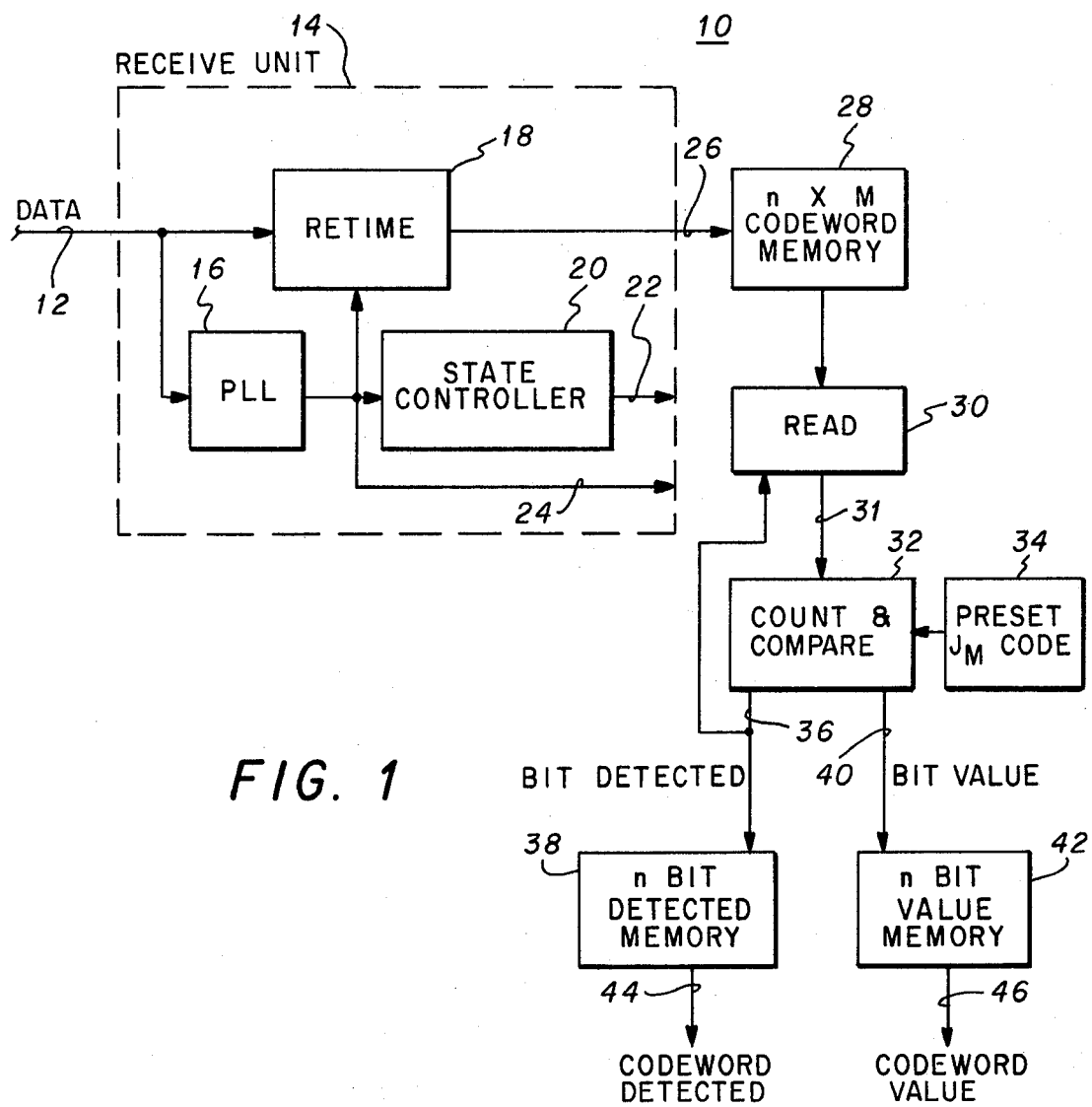
FIG. 1 is a schematic circuit diagram of a digital codeword detector enabling fast response detection.

FIG. 1 shows a digital codeword detector generally designated 10. Data from transmission line 12 is received by a receive unit 14. This receive unit is known in the art, and will only be briefly described. A clock recovery circuit 16, such as a phase locked loop, extracts the clock signals from the data. These clock signals are delivered to a retime circuit 18, such as a retime flip-flop, to retime or synchronize the data to the recovered clock. The extracted clock signals from circuit 16 are also delivered to a state controller 20 which outputs framing configuration and bit sequencing identification on bus 22. The extracted clock signals from circuit 16 are also delivered on output clock line 24. Buses 22 and 24 are connected to the remaining circuitry, to be described, for bit sequencing and clocking.

The data on line 12 may be either serial or parallel. In some applications involving high speed serial or parallel data on transmission line 12, a demultiplexing unit, not shown, may be provided at the output of circuit 18 to output a plurality of parallel data channels as controlled and timed by the bit sequencing and framing configuration identification from state controller 20. The data output on bus 26 may be serial or parallel.

Data from receive unit 14 is stored in a codeword memory 28 having a capacity n×M, where n is the number of bits in a codeword and M is a number of consecutive codewords in a given framing format or configuration. The framing configuration identification output on bus 22 from state controller 20 provides group synchronization signals, and provides word synchronization signals for noncyclic codes. These synchronization signals control bit sequencing for identifying the codeword bit-positions of the received group of data bits, and control entry into memory 28. The codeword bit-positions are either absolute (for noncyclic codes) or relative to an arbitrarily chosen start of a codeword (cyclic codes). Codeword memory 28 is any form of storage which can be accessed for storage and retrieval of data, e.g., shift register, random access memory, etc.

Read logic 30 reads every $n^{th}$ bit from memory 28 starting with one of the bits of the most recent codeword as designated by the bit sequencing control on bus 22. Read logic 30 transfers these data bits to count and compare logic 32. Read logic 30 reads the value of the same bit-position for successive, and successively older, codewords. This read process continues until M bits have been read or until the count and compare logic 32 signals that it has made a positive determination of the bit value, whichever comes first. Read logic 30 then reads every $n^{th}$ bit from memory 28 starting with another bit of the most recent codeword as controlled by the bit sequencing configuration on bus 22. In the same manner, the read process is repeated for all n bit-positions of the codewords.

Count and compare logic 32 determines the number of ones and zeros in each sequence of bits received from memory 28 and compares these numbers to varying threshold values $j_m$, determined by the first m bits of a preset $J_M$ code, designated 34. This threshold $j_m$ varies according to the number m of bits received from memory 28, where m=1, 2, ..., M. When the number of ones or zeros equals or exceeds $j_m$, a bit detected signal 36 is generated which is fed back to read logic 30 to terminate the read process. The bit detected signal 36 is also sent to a bit detected memory 38 having a capacity of at least n bits, which keeps track of the number of detected bits in the codeword. Count and compare logic 32 also transmits a bit value signal 40 to a bit value memory 42 having a capacity of at least n bits, which saves the values of the different bit-positions of the codeword. The bit-positions for the detected bit values are determined by the bit sequencing configuration from bus 22. Read logic 30 and count and compare logic 32 may be replicated to allow for sufficient processing power, i.e., parallel processing, if need for sufficiently fast processing of the bit-positions in the codewords. When all bits of the codeword have been detected, a codeword detected signal 44 is generated by bit detected memory 38. Bit value memory 42 yields the codeword value on bus 46.

Figure 2:
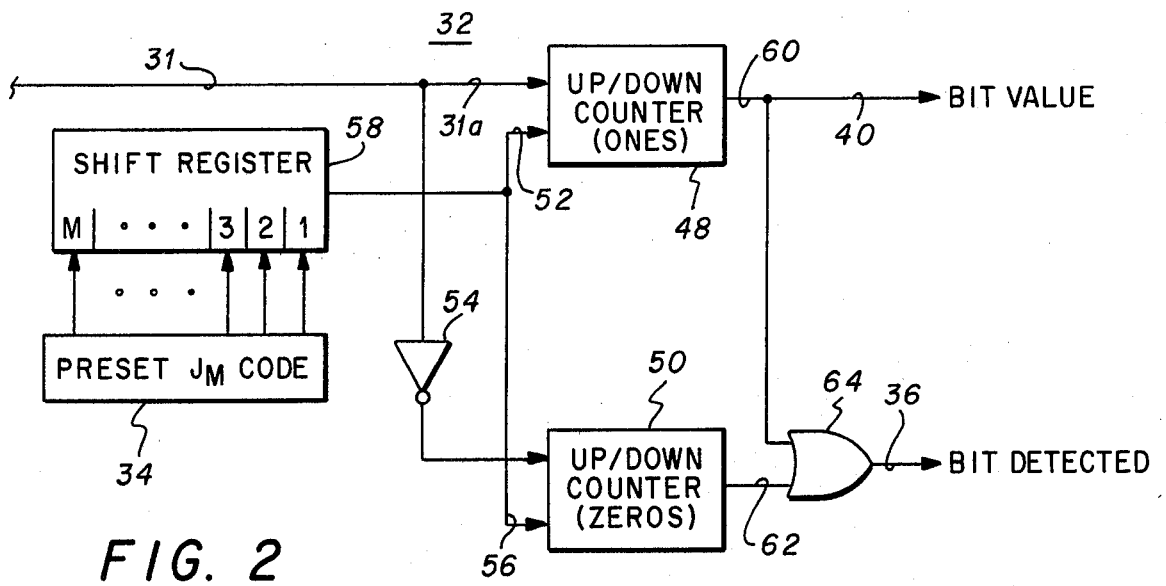
FIG. 2 is a schematic circuit diagram of the count and compare logic of FIG. 1.

FIG. 2 shows count and compare logic 32 of FIG. 1. Data codeword bits on line 31 from read logic 30 are delivered to separate counters 48 and 50. Counter 48 is a ones counter and is conditionally incremented by bits on line 31 having a value of one, as selectively enabled by the logic state on its enable port 52. Counter 50 receives the data bits from line 31 through an inverter 54 such that counter 50 is a zeros counter and is conditionally incremented by bits on line 31 having a value of zero, as selectively enabled by the logic state on its enable port 56.

A shift register 58, having a capacity of at least M bits, is loaded with an M bit preset $J_M$ code 34. The content of shift register 58 is serially input to the enable ports 52 and 56 of the up/down counters 48 and 50 one bit at a time concurrently with data bits from line 31. The data bits on line 31 are compared bit by bit against the $J_M$ code. If both inputs to a counter are one or zero, the counter does not change. If the data bit is one and the shift register bit is zero, the counter is decremented by 1, i.e., incremented negatively. If the data bit is zero and the shift register bit is one, the counter is incremented positively by 1.

If a counter value becomes negative, a high signal is generated to indicate that a bit has been detected. If a data bit of value one has been detected, counter 48 is incremented to a given overflow (in this case becomes negative by 1), and output 60 goes high. If a data bit of value zero has been detected, counter 50 is incremented to a given overflow (in this case becomes negative by 1), and output 62 goes high. Outputs 60 and 62 are input to an OR gate 64 which yields bit detected signal 36 of FIG. 1 if either output 60 or 62 goes high. If output 60 goes high, the bit value for that bit-position is one, and output 60 provides bit value signal 40 of FIG. 1. If output 62 goes high, the bit value for that bit-position is zero, and output 60 is low to thus provide bit value signal 40 as a zero. Counters 48 and 50 are reset to O by the bit sequencing control on bus 22 when the count and compare logic starts processing a new bit-position.

As a teaching tool, FIG. 3 schematically illustrates the organization of memory 28. The memory can hold M codewords, each n bits long. Every $n^{th}$ bit is read out of the memory, starting with a given bit. For example, starting with the third bit-position, the data bits read out of memory 28 and appearing on line 31 are those in column box 29, namely "1011 ... 1". This series of bits is shown in FIG. 4, reading right to left, directly above an exemplary $J_M$ code to facilitate understanding of the bit-by-bit comparison therebetween. The $J_M$ code is a simplified example using a 12 bit code, i.e., M=12. M is usually much larger; for example M=64 is convenient for the standard North American telecommunication framing format.

Using the example in FIG. 3, the third bit-position in the first codeword is read out of memory 28 such that a bit value "1" appears on line 31, as shown by the right-most bit in FIG. 4 for the line 31 data. The first bit in the $J_M$ code is also a "1" as shown by the right-most bit-position for the $J_M$ code in FIG. 4. Each of the inputs 31a and 52 to counter 48 thus has a value "1", and hence counter 48 does not change.

The next bit on line 31 is the value in the third bit-position of the second codeword, which is a "0". The second bit in the $J_M$ code is a "1". For this second comparison then, there is a "0" on input 31a and a "1" on input 52, which in turn causes the counter to be positively incremented by 1. This is shown by the +1 contents of counter 48 in FIG. 4 after the second comparison.

The next bit on line 31 is the value in the third bit-position of the third codeword, which is a "1". This is compared against the third bit in the $J_M$ code which is a "0". These "1" and "0" values on respective inputs 31a and 52 cause counter 48 to be decremented by 1, i.e., incremented negatively by 1, thus resulting in cumulative contents therein of 0, as shown in FIG. 4 as of the third comparison.

The next bit on line 31 is the value in the third bit-position of the fourth codeword, which is a "1". This is compared against the fourth bit in the $J_M$ code, which is a "0". These "1" values on respective inputs 31a and 52 cause counter 48 to be incremented negatively by 1, resulting in a $-1$ contents in counter 48 as shown as of the fourth comparison in FIG. 4. This negative counter value is the given overflow condition for counter 48, and output 60 goes high in response thereto, which in turn provides bit detected signal 36 and bit value signal 40.

Analyzing the line 31 data bits in FIG. 4, it is seen that there are three "1's" and one "0". There are thus three out of four equal bit values. The first four bits of the $J_M$ code constitute an initial threshold $j_m$ equal to three. If three equal values in the given bit-position of the first four codewords are found, then the given counter overflow condition is met and a bit detected signal is generated.

Counter 50 receives the inverse of the data bits shown on FIG. 4. Counter 50 is incremented positively by 1 upon the first comparison, and does not change for the remaining comparisons, whereby counter 50 has a $+1$ content after the fourth comparison and hence does not reach the given overflow condition. If the data bits of line 31 were the opposite of that shown in FIG. 4, i.e., three out of four "0's", the counter 50 would reach the given overflow condition of a $-1$ content. Output 62 would then go high, which provides bit detected signal 36, and bit value signal 40 as a zero.

FIG. 5 shows a different sequence of data bits on line 31 to illustrate the case where the number of equal values in the first four bit-positions does not equal or exceed three. That is, the same given bit-position in the first four codewords (m=4) is checked, and the number of equal values is less than three ($j_m = 3$). FIG. 5 shows a sequence of data bits on line 31 having two "0's" and two "1's" in the first four bits. The sequence of data bits in FIG. 5, reading from right to left, would correspond to a sequence of data bits in a given bit-position in FIG. 3 reading from top to bottom. The $J_M$ code in FIG. 5 is the same as that in FIG. 4.

In FIG. 5, the first data bit on line 31 is a "0", and the first bit of the $J_M$ code is a "1". These "0" and "1" values on respective inputs 31a and 52 cause counter 48 to be incremented positively by 1, as shown in FIG. 5. The second comparison likewise results in positive incrementation of the counter 48, whereby the latter has a cumulative content of $+2$. The next comparison involves a "1" on input 31a and a "0" on input 52, which causes decrementation of the counter back to a $+1$ value. The fourth comparison likewise involves a "1" on input 31a and a "0" value on input 52, which again causes negative incrementation of counter 48, resulting in a content value of 0 in the latter. Thus, after four codewords, counter 48 has not reached its given overflow condition of $-1$, and hence does not cause generation of a bit detected signal. This is because the number of equal values in the first four bit-positions did not exceed threshold $j_m = 3$.

Continuing in FIG. 5, the fifth bit on line 31 is a "1" and is compared against the fifth bit in the $J_M$ code which is a "1", which causes no change in counter 48. The content of the latter thus remains at 0. The sixth comparison likewise involves a pair of "1's", which leaves the content of counter 48 unchanged. The seventh bit on line 31, which is from the seventh codeword of memory 28 (m=7), is a "1", and the seventh bit of the $J_M$ code is a "0", which causes counter 48 to be negatively incremented by 1. This results in a $-1$ content value in counter 48, which is the given overflow condition.

Analyzing FIG. 5, it is seen that counter 48 went negative after seven bit-by-bit comparisons, m=7. The data bits on line 31 are the same given bit-positions of the first seven codewords. Of the values in these given codeword bit-positions, five are "1's" and two are "0's". There are thus five out of seven equal bit values. Thus, the variable threshold $j_m = 5$ when m=7.

In the particular example given in FIGS. 4 and 5, a first threshold was set at three out of four equal bit values, and a second threshold was set at five out of seven equal bit values. The five out of seven ratio is smaller than three out of four because of the larger sample taken, i.e., m=7 in the second case but m=4 in the first case.

Figure 6:
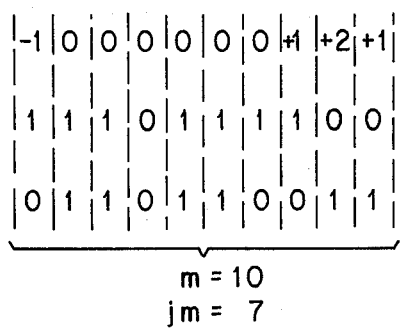

FIG. 6 shows the same $J_M$ code as FIGS. 4 and 5, but a different sequence of data bits on line 31 which does not have five equal bit values in the first seven codewords. In the sequence of data bits on line 31 in FIG. 6, there are only four equal bit values out of the first seven checked. This does not cause counter 48 to reach its given overflow condition of $-1$ content. The values in the given bit-position of the 8th, 9th and 10th codewords are "111" and are compared respectively against the 8th, 9th, and 10th bits in the $J_M$ code which are "110". This causes counter 48 to go negative after the 10th comparison, which results in generation of the bit detected signal. In FIG. 6, there are seven equal bit values on line 31 in the first ten bit-positions, and thus it is seen that $j_m = 7$ when m=10.

The full twelve bit $J_M$ code of FIGS. 4, 5 and 6 has a threshold of eight. That is, if eight out of the first twelve bit-positions checked have equal values, then a bit detected signal is generated.

Figure 7:
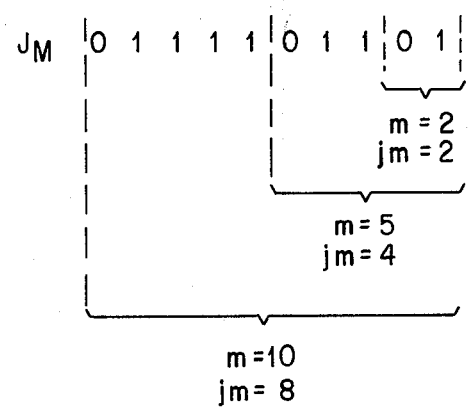
Figure 8:
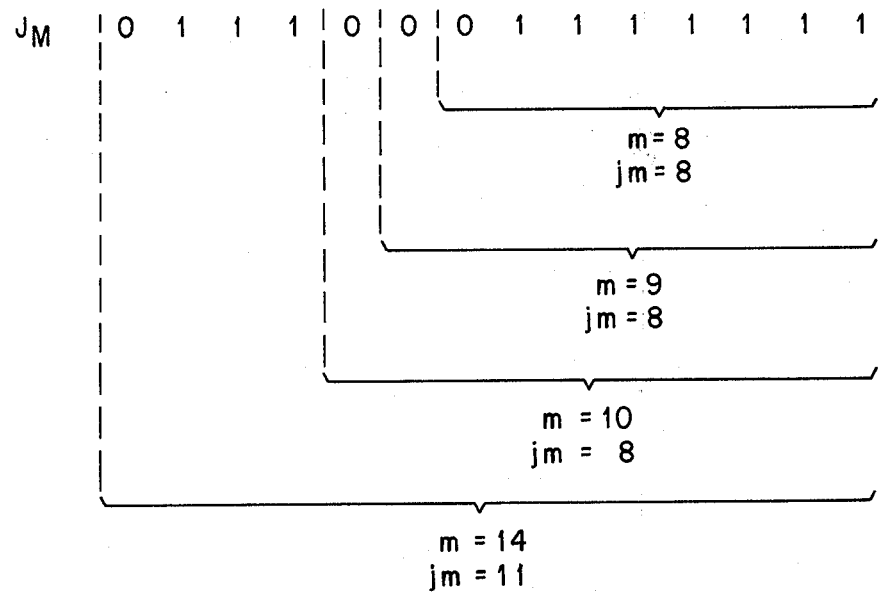

FIG. 7 shows another exemplary $J_M$ code, with a varying threshold $j_m$ dependent upon m. FIG. 8 shows still another $J_M$ code as an illustrative example.

The present $J_M$ code is determined such that the sum of the first m bits (bits 1, 2, ..., m) is equal to $j_m - 1$, where m=1, 2, ..., M. A constant $j_m$ may be provided by setting the first $j_m - 1$ bits at "1" and the remaining bits at "0".

The invention includes the method for detecting redundant digital codewords repeatedly transmitted over a digital transmission system, comprising checking corresponding bit-positions for a varying number m of consecutive n bit codewords and comparing the number of equal values in each bit-position against a varying threshold $j_m$ dependent upon m. This affords faster detection under low error conditions. For example, referring to FIG. 8, if the first eight bit-positions all have equal values, then the then-current threshold $j_m$ is reached, and there is not need to continue checking additional codewords, i.e., the ninth through fourteenth codewords (m=9 through 14) are not checked. This extra checking is particularly time consuming for large values of M, such as 64.

Further, in the example in FIG. 8, the variable threshold $j_m$ remains at eight for the ninth codeword checked, and also remains at eight for the tenth codeword checked. Thus, if eight out of the first nine or the first ten bit values are equal, then the threshold is reached. Continuing in the example of FIG. 8, the variable threshold in eleven ($j_m=11$) for the first fourteen codewords checked (m=14).

The number m of consecutive codewords checked varies for each of the n bit-positions of the codewords, with $j_m$ varying as a function of m. Each of the n bit-positions is initially checked for a low number m of consecutive codewords, and m is increased until the number of equal bit values in that bit-position reaches the then current $j_m$ set by the then current m, for until m reaches a given maximum M. The bit-position are checked by counting ones and zeros, and comparing the two counts against variable threshold $j_m$ such that a bit detected signal is provided if either count equals or exceeds the dictated $j_m$ for the number m of codewords then currently checked for that bit-position, and providing a codeword detected signal if bit detected signals have been provided for all n bit-positions.

A given bit-position of each of a variable number m of codewords is read from a first memory having a bit capacity of at least $n \times M$, storing M codewords, each n bits long, where $m \leq M$. The values of the m bit-positions are counted and compared against variable threshold $j_m$ dependent upon m, and m is increased by reading the same given bit-position for successive, and successively older, codewords until the count reaches $j_m$ or until m=M. A bit detected signal is output if the count reaches $j_m$. This sequence of steps is repeated for each of the remaining bit-positions of the codewords.

Variable threshold $j_m$ is determined according to the first m bit-positions in the M bit preset code $J_M$. The m bit-position of the codewords are compared bit by bit against the first m bit-positions of $J_M$, providing $j_m$.

A second memory having a capacity of at least n bits stores the bit detected signal, and outputs a codeword detected signal if its content reaches n bits. A third memory having a capacity of at least n bits stores the bit value signal, and outputs a codeword value signal.

Shift register 58 of FIG. 2 has a capacity of at least M bits for holding M bit preset code $J_M$ whose first m bit-positions determine $j_m$. Ones counter 48 conditionally counts the number of ones in the m codeword bit-positions as selectively enabled in bit-by-bit comparison against $j_m$ from shift register 58. Zeros counter 50 conditionally counts the number of zeros in the m codeword bit-positions as selectively enabled in bit-by-bit comparison against $j_m$ from shift register 58.

Memory 28 may initially be empty or filled with up to M codewords. The count and compare processing does not wait for all of the M codewords, but rather starts as soon as there is any data in memory 28. It is a significant feature of the invention that the detection process is hopefully completed before all of the M codewords have been received. If the group of M or less codewords does not provide n detection, i.e., there are less than n bit detected signals as evidenced by memory 38 having a content less than n, then memory 28 is updated with one new codeword and the oldest codeword is discarded or written over. Data may be written to memory 28 one bit at a time (n entries make up a codeword) or several bits at a time if the data is received on parallel circuits or is demultiplexed into parallel circuits. If memory 28 is updated bit by bit, the respective bit-position of the codeword is checked as soon as it is written to memory 28 and the comparison is finished in time to start processing the next bit-position as soon as the next bit is written to memory 28. The oldest bit in memory 28 is discarded or overwritten. If memory 28 is updated word by word, the comparison is started with any of the bit-positions and the processing of all n bit-positions is completed before the next word is stored in memory 28.

It is recognized that various modifications are possible within the scope of the appended claims.

We claim:

1. A method for detecting redundant digital codewords repeatedly transmitted over a digital transmission system, comprising checking the values of bits in corresponding bit-positions for a varying number of m of consecutive n bit codewords, and comparing to determine, for each bit-position, when a count of bits having equal values reaches a varying threshold $j_m$ dependent upon m, thereby affording fast detection under low error conditions.

2. The invention according to claim 1 wherein the number m of consecutive codewords checked is a variable over each of the n bit-positions of the codewords, with $j_m$ varying as a function of m.

3. The invention according to claim 1, wherein said step of checking includes checking values in each of the n bit-positions initially for a low number m of consecutive codewords, and increasing m until said count of bits having equal values in that bit-position reaches the then current $j_m$ set by the then current m, or until m reaches a given maximum M.

4. The invention according to claim 3, wherein said checking the values in said bit-positions includes counting ones and zeros, and said comparing includes comparing the ones and zeros counts against variable threshold $j_m$ such that a bit detected signal is provided if either count equals or exceeds the dictated $j_m$ for the number m of codewords then currently checked for that bit-position, and providing a codeword detected signal if bit detected signals have been provided for all n bit-positions.

5. A method for detecting redundant digital codewords repeatedly transmitted over a digital transmission system, comprising:
   reading the values in a given bit-position of each of a variable number m of codewords, where $m \leq M$;
   counting, for plural bit values, the number of said m bits in said given bit-position assuming each bit value, and comparing the counts against a variable threshold $j_m$ dependent upon m;
   increasing m and repeating said reading, counting and comparing until one of said counts reaches $j_m$ or until m=M;
   outputting a bit detected signal if said one count reaches $j_m$; and
   repeating the above sequence of steps for each of the remaining bit-positions in the codewords.

6. The invention according to claim 5 further comprising determining said variable threshold $j_m$ according to the first m bits in a preset $J_M$ code having M bits.

7. The invention according to claim 6, wherein said counting and comparing include counting and comparing said m bits in said given bit-position of said codewords bit by bit against said first m bits of $J_M$ providing $j_m$.

8. The invention according to claim 7 wherein said repeated reading includes reading the same said given bit-position for successive, and successively older, codewords.

9. The invention according to claim 8 wherein the sum of the bits in the first m bits of $J_M$ is equal to $j_m - 1$.

10. The invention according to claim 8 wherein said $J_M$ code is preset according to user choice, and affords fast codeword detection by providing said bit detected signals from less than M bits when said variable threshold $j_m$ is reached.

11. The invention according to claim 8, wherein said bit by bit counting and comparing includes:

separately counting ones and zeros for said m bits in said given bit-position as selectively enabled bit by bit according to the first m bits of $J_M$, such that a given overflow of either ones-counting or zeros-counting provides said bit detected signal.

12. The invention according to claim 11 wherein a bit value signal is provided by the output of one of said countings.

13. A digital codeword detector for detecting redundant codewords repeatedly transmitted over a digital transmission system, comprising:

a first memory having a bit capacity of at least $n \times M$ bits for storing M codewords, each n bits long;

means for reading from said first memory the values in a given bit-position of each of a variable number m of codewords, where $m \leq M$;

means for counting, for plural bit values, the number of said bits read in said given bit-position assuming each bit value, and comparing the counts against a variable threshold $j_m$ dependent upon m, and increasing m by reading, counting and comparing for the samd said given bit-position for successive, and successively older, codewords, until one of said counts reaches $j_m$ or until m=M, and outputting a bit value signal and a bit detected signal if said one count reaches $j_m$;

a second memory, responsive to said means for counting and comparing and having a capacity of at least n bits, for storing said bit detected signal, and outputting a codeword detected signal if its contents reach n bits; and a third memory, responsive to said means for counting and comparing and having a capacity of at least n bits, for storing said bit value signal, and outputting a codeword value signal.

14. The invention according to claim 13 wherein said counting and comparing means comprises:

a shift register having a capacity of at least M bits for holding an M-bit preset code $J_M$ whose first m bits determine $j_m$;

a ones counter for conditionally counting the number of ones in said m codeword bit-positions as selectively enabled in bit-by-bit comparison against $j_m$ from said shift register; and a zeros counter for conditionally counting the number of zeros in said m codeword bit-positions as selectively enabled in bit-by-bit comparison against $j_m$ from said shift register.

15. The invention according to claim 14, including means for shifting the m bits of $j_m$ out of said shift register one bit at a time to each of said counters to enable or disable incrementation one way or the other of each counter in bit-by-bit response to each of said respective m codeword bits.

16. The invention according to claim 15, including means for shifting the content of said shift register out bit by bit, increasing m and altering $j_m$, until one of said counters is incremented to a given overflow or until m=M.

17. The invention according to claim 16, wherein said counting and comparing means further includes means responsive to each of said counters to provide said bit detected signal when either counter reaches said given overflow.

18. The invention according to claim 17 wherein said bit value signal is provided by the output of one of said counters.

* * * * *